(12) United States Patent
Jalpa et al.

(10) Patent No.: US 10,399,475 B2
(45) Date of Patent: Sep. 3, 2019

(54) HEADREST WITH DEPLOYABLE NECK PILLOW FEATURE

(71) Applicant: Ford Global Technologies, LLC, Dearborn, MI (US)

(72) Inventors: Jonathan Kaleb Jalpa, Azcapotzalco (MX); Carla Flores, Toluca (MX); Arturo Sebastian Fernandez, Naucalpan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 125 days.

(21) Appl. No.: 15/834,257

(22) Filed: Dec. 7, 2017

(65) Prior Publication Data

US 2019/0176671 A1  Jun. 13, 2019

(51) Int. Cl.
*B60N 2/885* (2018.01)
*B60N 2/838* (2018.01)

(52) U.S. Cl.
CPC ............. *B60N 2/885* (2018.02); *B60N 2/838* (2018.02)

(58) Field of Classification Search
None
See application file for complete search history.

(56) References Cited

U.S. PATENT DOCUMENTS

| | | | |
|---|---|---|---|
| 5,531,505 A | 7/1996 | Baetz et al. | |
| 5,752,742 A | 5/1998 | Kerner et al. | |
| 5,868,471 A * | 2/1999 | Graham | A47C 7/383 297/397 |
| 5,997,091 A | 12/1999 | Rech et al. | |
| 6,206,470 B1 * | 3/2001 | Baloga | B60N 2/2821 297/250.1 |
| 6,220,668 B1 | 4/2001 | Scheffzuck | |
| 8,469,032 B2 * | 6/2013 | Farnum | A61G 13/1215 128/845 |
| 9,216,676 B1 | 12/2015 | Reyes Luna | |
| 2004/0195894 A1 * | 10/2004 | Pal | B60N 2/4279 297/406 |
| 2006/0001307 A1 * | 1/2006 | Embach | B60R 7/043 297/391 |
| 2006/0244300 A1 * | 11/2006 | Watson Savage | B60N 2/856 297/397 |
| 2007/0114830 A1 * | 5/2007 | Newman | A47C 4/00 297/440.1 |

(Continued)

*Primary Examiner* — David E Allred
(74) *Attorney, Agent, or Firm* — Vichit Chea; Price Heneveld LLP

(57) ABSTRACT

A headrest assembly includes a headrest bun and first and second side supports coupled to first and second side portions of the headrest bun by first and second hinge assemblies, respectively. The first and second side supports each include respective first and second receiving wells and are operable between retracted and deployed positions relative to the headrest bun. A support member is partially received within the headrest bun and includes first and second locator pins extending outwardly from the first and second side portions of the headrest bun, respectively. The first and second locator pins are received in the first and second receiving wells when the first and second side supports are in the retracted position. The hinge assemblies each include a first pivot axis and a second pivot axis. The side support is rotatable along both the first and second pivot axes relative to the headrest bun.

15 Claims, 10 Drawing Sheets

(56) References Cited

U.S. PATENT DOCUMENTS

| | | | |
|---|---|---|---|
| 2007/0273194 A1* | 11/2007 | Fraser | A47C 7/383 297/397 |
| 2015/0197170 A1 | 7/2015 | Obukhov | |
| 2016/0009205 A1 | 1/2016 | Reyes Luna | |
| 2016/0151223 A1* | 6/2016 | Ferro | A61G 13/1245 128/845 |
| 2018/0370398 A1* | 12/2018 | Chiang | B60N 2/885 |

* cited by examiner

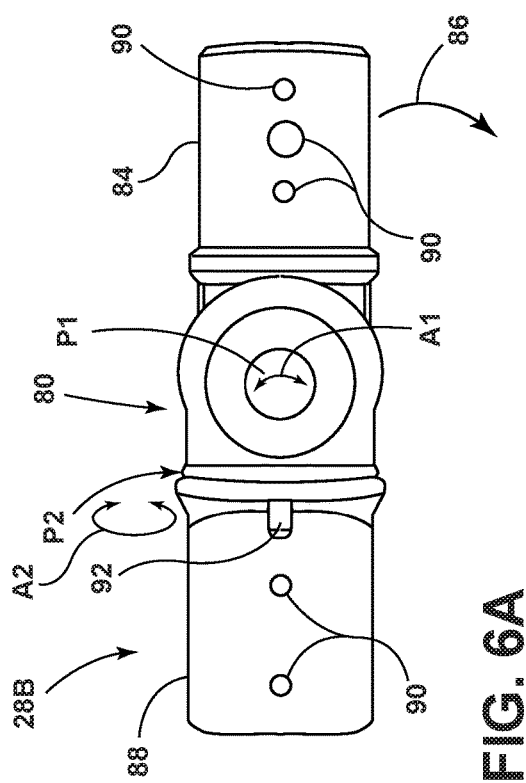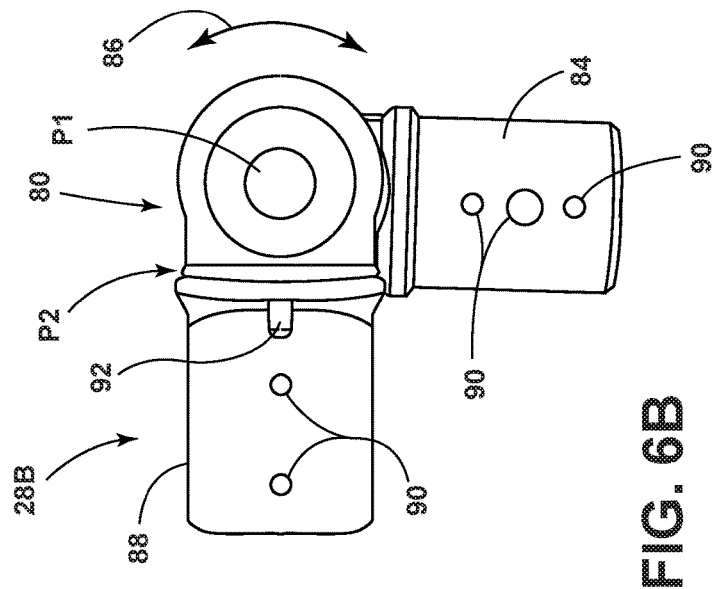
FIG. 6A
FIG. 6B

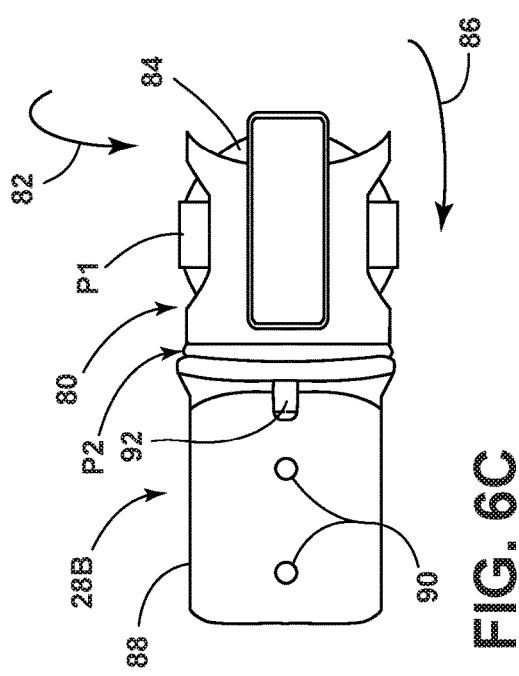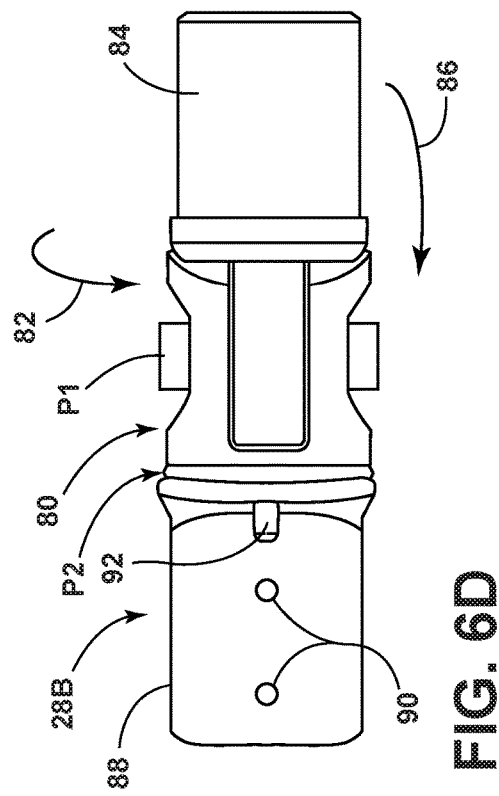

HEADREST WITH DEPLOYABLE NECK PILLOW FEATURE

FIELD OF THE INVENTION

The present invention generally relates to a headrest assembly for a seat assembly, and more particularly, to a headrest assembly having deployable side supports that are configured to provide enhanced neck and head support for a seat assembly occupant.

BACKGROUND OF THE INVENTION

When taking long trips, traveling in a vehicle early in the morning, or driving late at night, vehicle passengers may wish to sleep in the vehicle while traveling. Often times, passengers cannot find a comfortable and supportive position for sleeping in a vehicle while seated and restrained by seatbelts. Neck pillows can be bulky and are only useful if a passenger remembers to bring them along before a trip. Thus, a headrest assembly with an integrated and selectively deployable head support enhancement feature is desired.

SUMMARY OF THE INVENTION

According to one aspect of the present invention, a headrest assembly includes a headrest bun and first and second side supports respectively coupled to first and second side portions of the headrest bun by first and second hinge assemblies. The first and second side supports include respective first and second receiving wells. The first and second side supports are operably between retracted and deployed positions relative to the headrest bun. A support member is partially received within the headrest bun and includes a first locator pin extending outwardly from the first side portion of the headrest bun. A second locator pin extends outwardly from the second side portion of the headrest bun. The first and second locator pins are respectively received in the first and second receiving wells of the first and second side supports when the first and second side supports are in the retracted position.

According to another aspect of the present invention, a headrest assembly includes a headrest bun and a side support having at least one receiving well. The side support is operably coupled to the headrest bun between retracted and deployed positions by a hinge assembly. At least one locator pin extends outwardly from the headrest bun and is received in the at least one receiving well of the side support when the side support is in the retracted position.

According to another aspect of the present invention, a headrest assembly includes a headrest bun and a side support pivotally coupled to the headrest bun by a hinge assembly. The hinge assembly includes an anchor portion pivotally coupled to a central hub for rotation along a first axis, and an attachment flange pivotally coupled to the central hub for rotation along a second axis. The side support is rotatable along both the first and second axes relative to the headrest bun.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIGS. 6A-6D are side elevational views of an embodiment of a hinge assembly for use with the present concept.

DETAILED DESCRIPTION OF THE PREFERRED EMBODIMENTS

Figure 1:
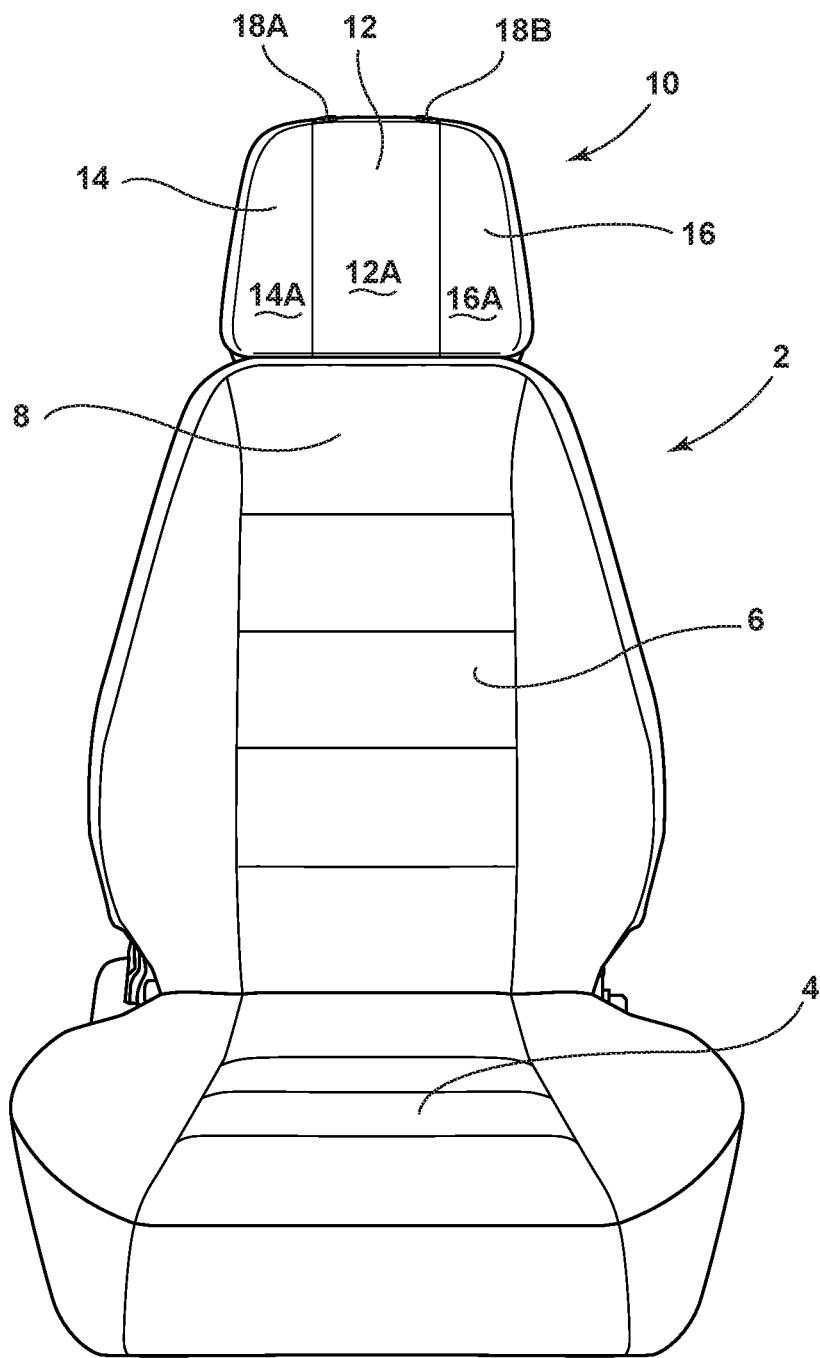
FIG. 1 is a front elevational view of a seat assembly having a headrest assembly according to one embodiment.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a seat assembly 2 is shown having a seat portion 4 and a seatback 6 with a headrest assembly 10 positioned on an upper portion 8 of the seatback 6. The seat assembly 2 shown in FIG. 1 is contemplated to be a vehicle seat which may be positioned in any location within a vehicle interior. Further, the headrest assembly 10 is shown positioned on a seat assembly 2 that is typically found in a driver's side or front passenger's side of a vehicle interior. However, the headrest assembly 10 of the present concept is contemplated to be used on any seat assembly within a vehicle, including, but not limited to, rear seat assemblies and third row seating options.

As further shown in FIG. 1, the headrest assembly 10 includes a headrest bun 12 which is generally centrally disposed with first and second side supports 14, 16 disposed on opposite sides of the headrest bun 12. The headrest bun 12 includes a front surface 12A and the first and second side supports 14, 16 also include front surfaces 14A, 16A, respectively. In the configuration shown in FIG. 1, the headrest assembly 10 is fully assembled, such that the front surfaces 12A, 14A, 16A of the headrest bun 12 and side supports 14, 16 are aligned with one another to provide a unitary support structure. The headrest assembly 10 further includes release buttons 18A, 18B disposed on the headrest bun 12 which are configured to be engaged by a user to release the first and second side supports 14, 16 from the upright retracted positions shown in FIG. 1. By releasing the first and second side supports 14, 16 using the release buttons 18A, 18B, the first and second side supports 14, 16 can be moved from the upright retracted or home position to deployed position as further described below. It is noted that while separate release buttons 18A, 18B are shown in FIG. 1, it is contemplated that a single release button may be used to release both the first and second side supports 14, 16 simultaneously for deployment of the same.

Figure 2:
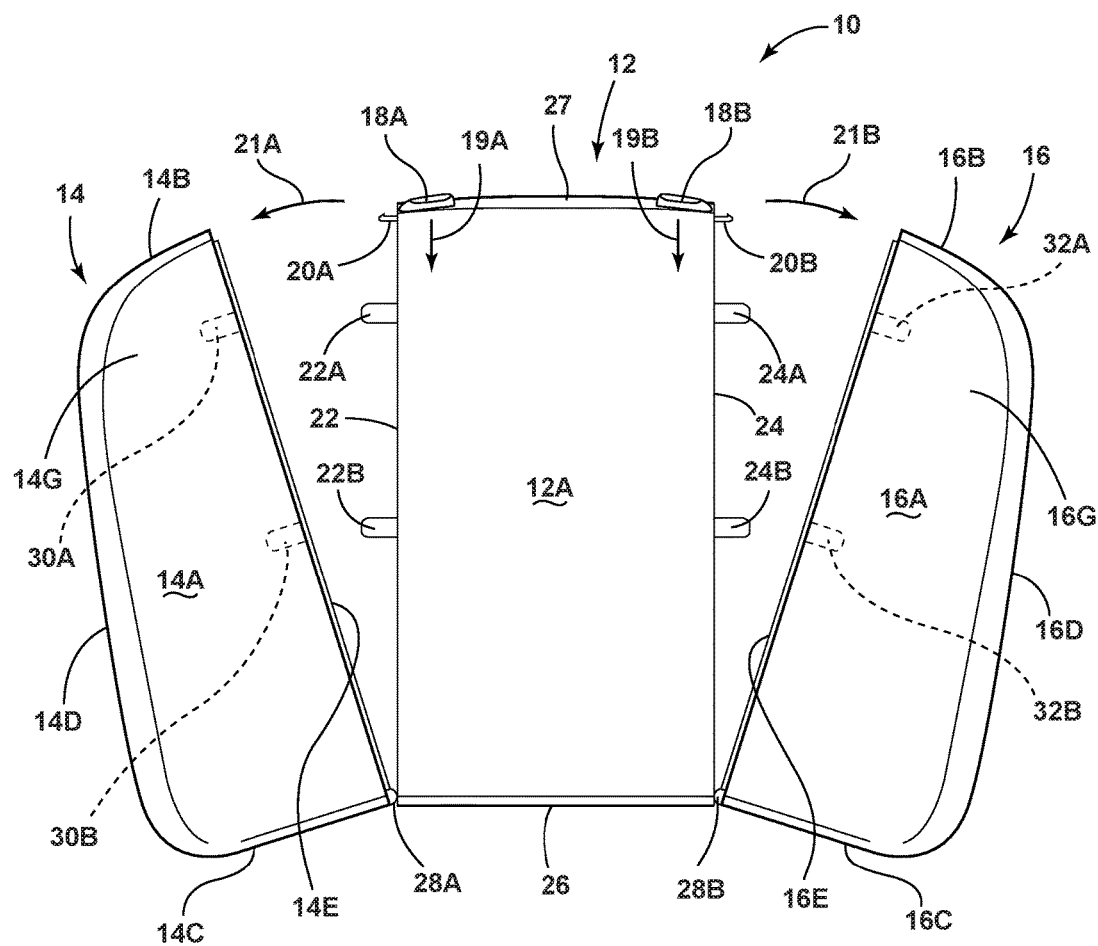
FIG. 2 is a front elevational view of the headrest assembly of FIG. 1, with side supports illustrated in partially deployed positions.

Referring now to FIG. 2, the headrest assembly 10 is shown with the first and second side supports 14, 16 in partially deployed positions. In moving the first and second side supports 14, 16 to the partially deployed positions shown in FIG. 2, a user will depress the release buttons 18A, 18B in a downward direction as indicated by arrows 19A, 19B which moves engagement features 20A, 20B in a downward direction as well. Movement of the engagement features 20A, 20B in the downward directions as indicated by arrows 19A, 19B causes the release of the first and second side supports 14, 16 from the upright retracted positions shown in FIG. 1. As released from the headrest bun 12 using the release buttons 18A, 18B, the first and second side supports 14, 16 will move along the deployment paths 21A, 21B, respectfully, away from the headrest bun 12. Specifically, in the embodiment shown in FIG. 2, the first and second side supports 14, 16 have pivoted away from the headrest bun 12 in opposite directions via first and second hinge assemblies 28A, 28B, as further described below.

As further shown in FIG. 2, the headrest bun 12 includes first and second side portions 22, 24 disposed on opposite sides of the front surface 12A. Further, the headrest bun 12 includes a lower portion 26 and an upper portion 27. In the embodiment shown in FIG. 2, the first and second release buttons 18A, 18B are shown disposed on the upper portion 27 on the headrest bun 12. The first and second side supports 14, 16 include respective upper portions 14B, 16B and lower portions 14C, 16C. The lower portions 14C, 16C of the first and second side supports 14, 16 are hingedly coupled to the headrest bun 12 at the first and second hinge assemblies 28A, 28B, respectively. Thus, as the first side support 14 moves along the deployment path as indicated by arrow 21A, the upper portion 14B of the side support 14 moves away from the upper portion 27 of the headrest bun 12. Similarly, as the second side support 16 moves to the deployed position, the upper portion 16B of the second side support 16 moves away from the upper portion 27 of the headrest bun 12 along the deployment path as indicated by arrow 21B. As the upper portions 14B, 16B of the first and second side supports 14, 16 move away from the headrest bun 12, the lower portions 14C, 16C of the first and second side supports 14, 16 pivot with respect to the lower portion 26 of the headrest bun 12 via the first and second hinge assemblies 28A, 28B.

As further shown in FIG. 2, upper and lower locator pins 22A, 22B are shown outwardly extending from the first side portion 22 of the headrest bun 12. Similarly, upper and lower locator pins 24A, 24B are shown outwardly extending from the second side portion 24 of the headrest bun 12. In use, the locator pins 22A, 22B are removeably received in the receiving wells 30A, 30B which are accessible via an inner side surface 14E of the first side support 14. Thus, the first side support 14 includes the front surface 14A and an opposed rear surface 14F, shown in FIG. 4C. The first side support 14 further includes the upper and lower portions 14B, 14C along with an outer side surface 14D which is opposed to the inner side surface 14E. Thus, the component parts 14A-14F of the first side support 14 cooperate to define a body portion 14G in which the upper and lower receiving wells 30A, 30B are inwardly disposed. In a similar manner, upper and lower locator pins 24A, 24B are received in receiving wells 32A, 32B which are accessible via an inner side surface 16E of the second side support 16. Thus, the second side support 16 includes a front surface 16A and an opposed rear surface 16F, shown in FIG. 4C. The second side support 16 further includes the upper and lower portions 16B, 16C along with an outer side surface 16D which is opposed to the inner side surface 16E. Thus, the component parts 16A-16F of the second side support 16 cooperate to define a body portion 16G in which the upper and lower receiving wells 32A, 32B are inwardly disposed.

Figure 3A:
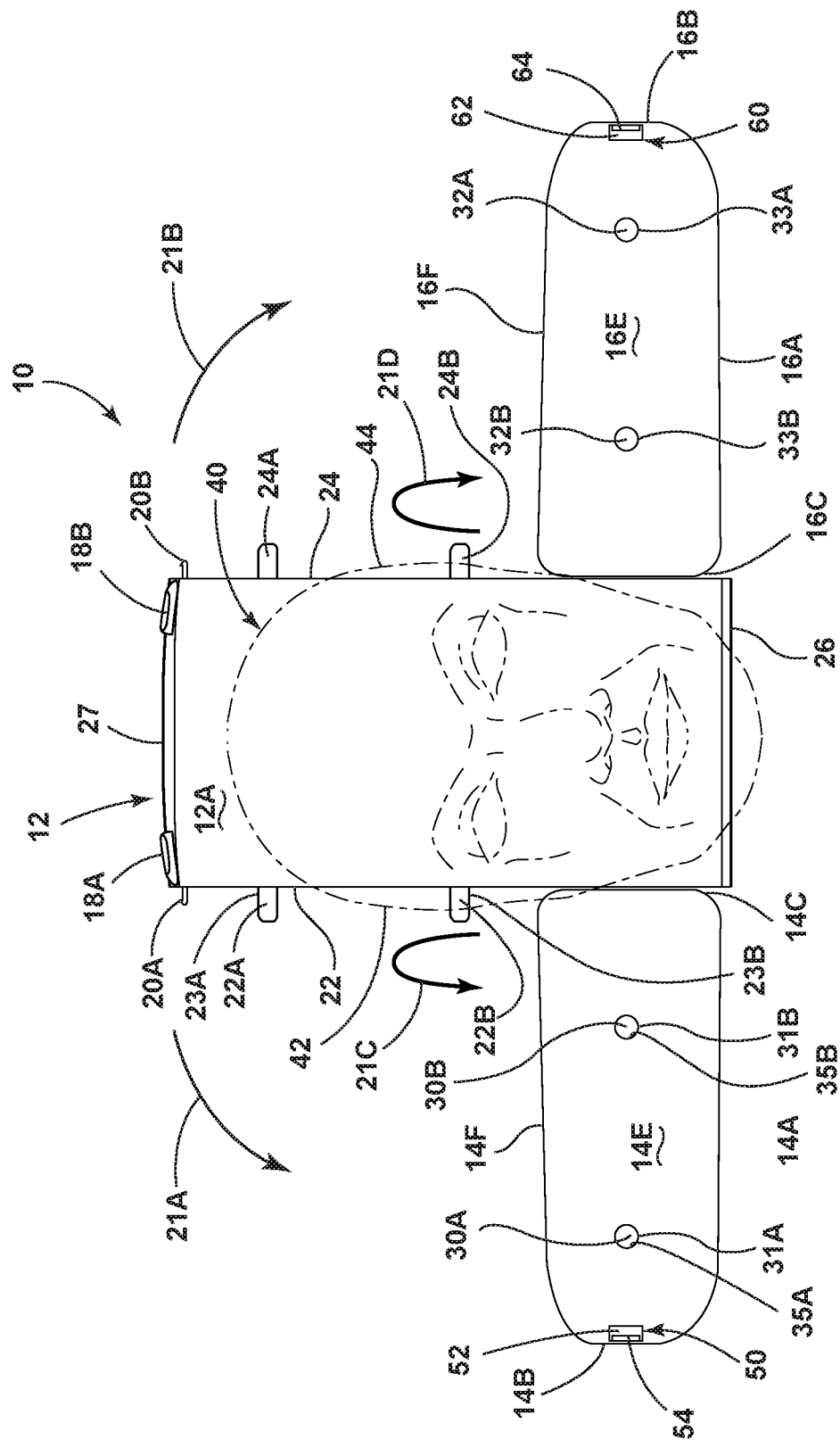
FIG. 3A is a is a front elevational view of the headrest assembly of FIG. 2, with the side supports illustrated in partially deployed positions adjacent a seat occupant's head shown in phantom.

Referring now to FIG. 3A, a head 40 of a presumed seat occupant is illustrated in phantom positioned adjacent to the front surface 12A of the headrest bun 12. The head 40 includes first and second sides 42, 44 which are configured to be supported by the first and second side supports 14, 16 respectively. In the embodiment shown in FIG. 3A the first and second side supports 14, 16 have been moved fully downward along the deployment paths 21A, 21B away from the first and second side portions 22, 24 of the headrest bun 12, respectively. Further, the first side support 14 has been rotated along a deployment path as indicated by arrow 21C. Similarly, the second side support 16 has been rotated along a deployment path as indicated by arrow 21D. The first and second hinge assembly 28A, 28B described above are contemplated to be dual axis hinge assemblies which provide for both the pivoting movement along the deployment paths as indicated by arrows 21A, 21B, and also provide for the rotating movement illustrated by deployment paths 21C, 21D for the first and second side supports 14, 16 respectively. Thus, in the embodiment shown in FIG. 3A, the inner side surfaces 14E, 16E of the first and second side supports 14, 16, respectively, are forward facing. With the inner side surface 14E of the first side support 14 shown in FIG. 3A, openings 31A and 31B are shown opening into receiving wells 30A, 30B, respectively. When the first side support 14 is moved back to the upright retained position, the upper and lower locator pins 22A, 22B of the first side portion 22 of the headrest bun 12 will be received in the receiving wells 30A, 30B, respectively, through the openings 31A, 31B thereof. With the inner side surface 14E of the first side support 14 shown in FIG. 3A, a retention feature 50 is shown positioned at the upper portion 14B of the first side support 14 and having a cavity portion 52 and an engagement member 54. In assembly, the retention feature 50 is configured to engage the engagement feature 20A of the headrest bun 12 to retain the first side support 14 in the upright retained position shown in FIG. 1. As noted above, when the release button 18A is downwardly depressed as indicated by arrow 19A (FIG. 2) the engagement feature 20A will also move downwardly to release form the engagement member 54 of the retention feature 50 to release the first side support 14 for deployment.

In a similar manner, the inner side surface 16E of the second side support 16 is shown in FIG. 3A, such that openings 33A and 33B are shown opening into receiving wells 32A, 32B, respectively. When the second side support 16 is moved back to the upright retained position (FIG. 1), the upper and lower locator pins 24A, 24B of the second side portion 24 of the headrest bun 12 will be received in the receiving wells 32A, 32B, respectively, through the openings 33A, 33B thereof. With the inner side surface 16E of the second side support 16 shown in FIG. 3A, a retention feature 60 is shown positioned at the upper portion 16B of the second side support 16. The retention feature 60, much like retention feature 50 of the first side support 14, includes a cavity portion 62 and an engagement member 64. In assembly, the retention feature 60 is configured to engage the engagement feature 20B of the headrest bun 12 to retain the second side support 16 in the upright retained position shown in FIG. 1. When the release button 18B is downwardly depressed as indicated by arrow 19B (FIG. 2) the engagement feature 20B will release form the engagement member 64 of the retention feature 60 to release the second side support 16 for deployment.

Figure 5A:
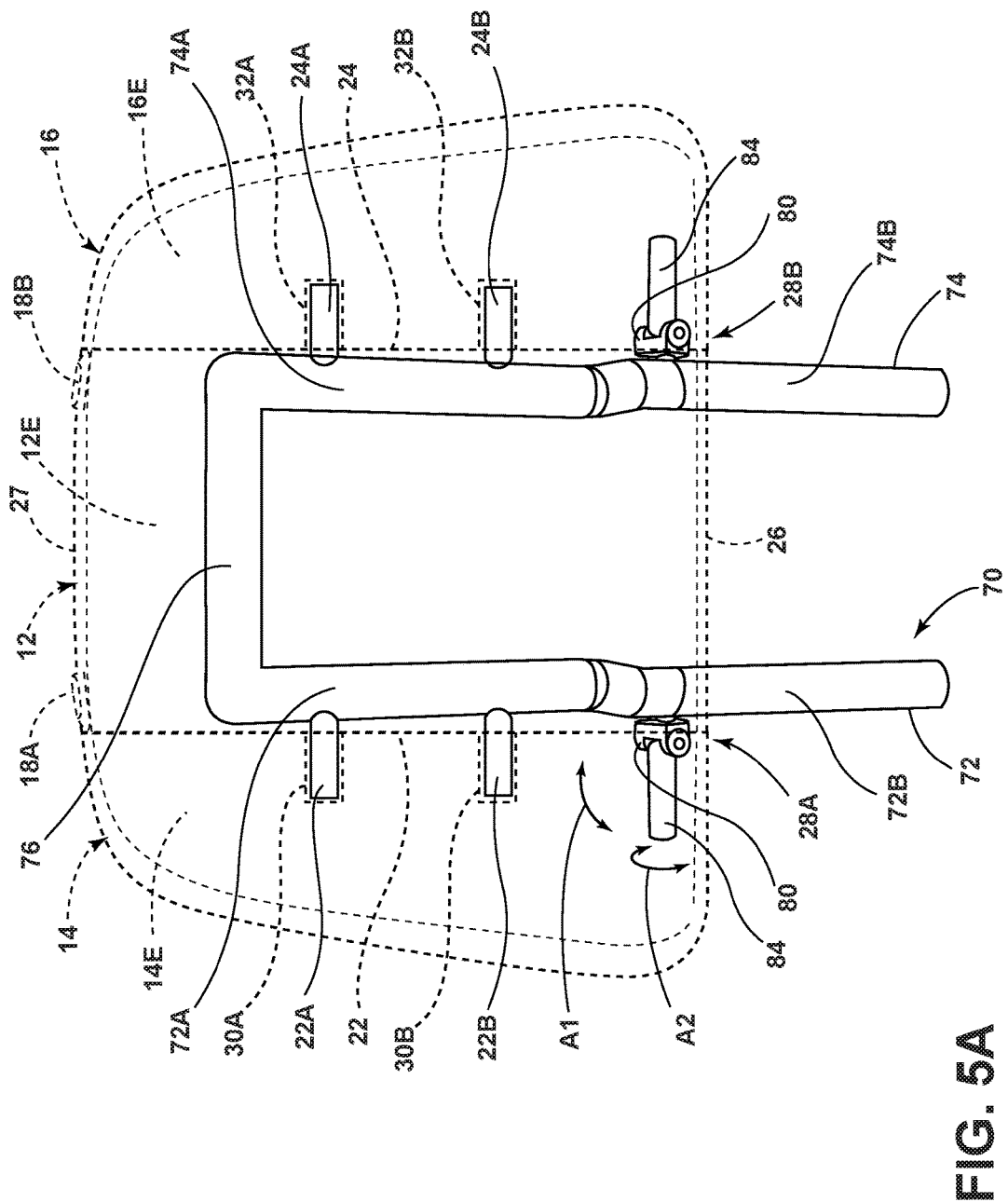
FIG. 5A is a front elevational view of the headrest assembly of FIG. 1 with the headrest bun and side supports shown in phantom to reveal a support member, locator pins and hinge assemblies.
Figure 5B:
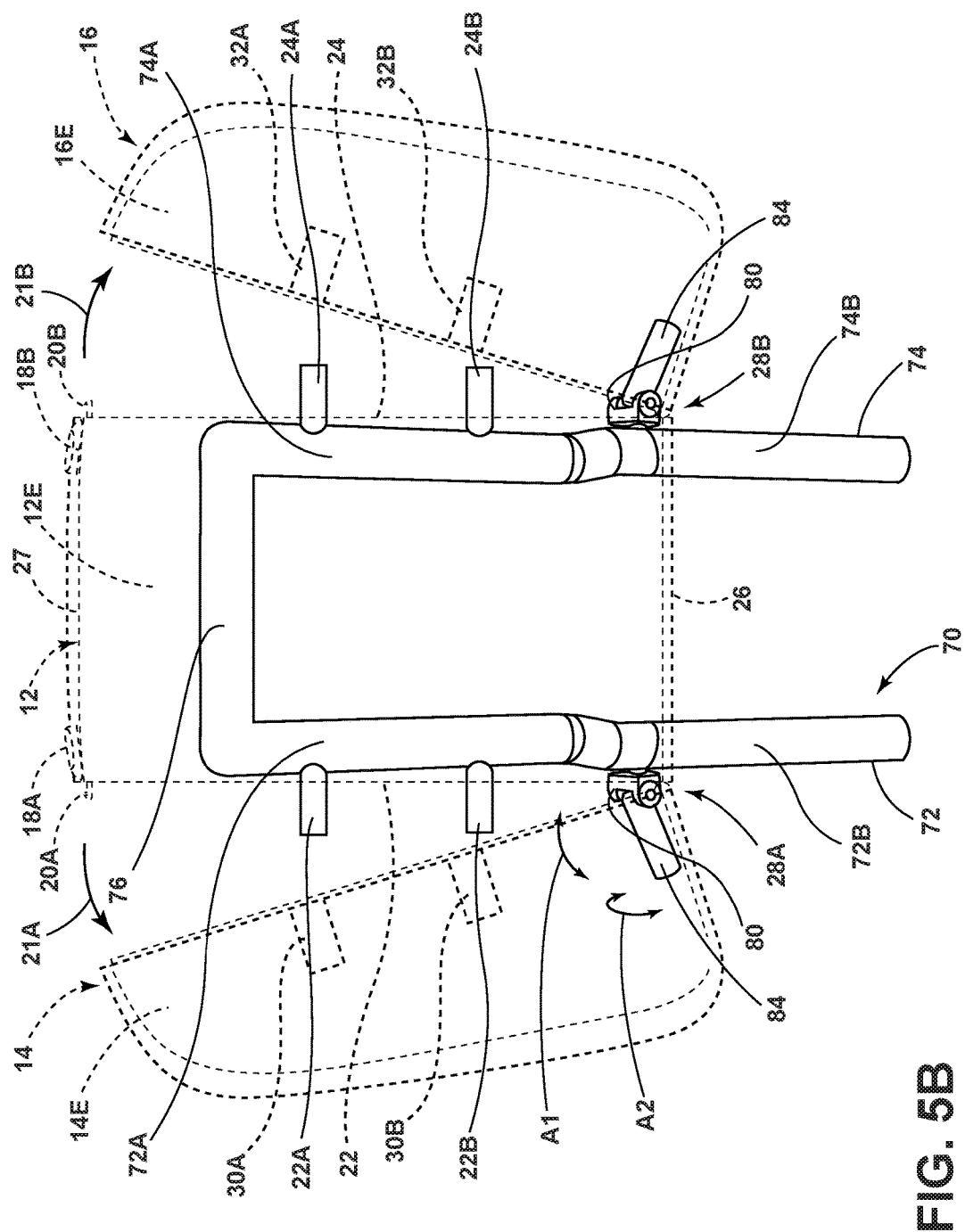
FIG. 5B is a front elevational view of the headrest assembly of FIG. 5A with the side supports in partially deployed positions.
Figure 5C:
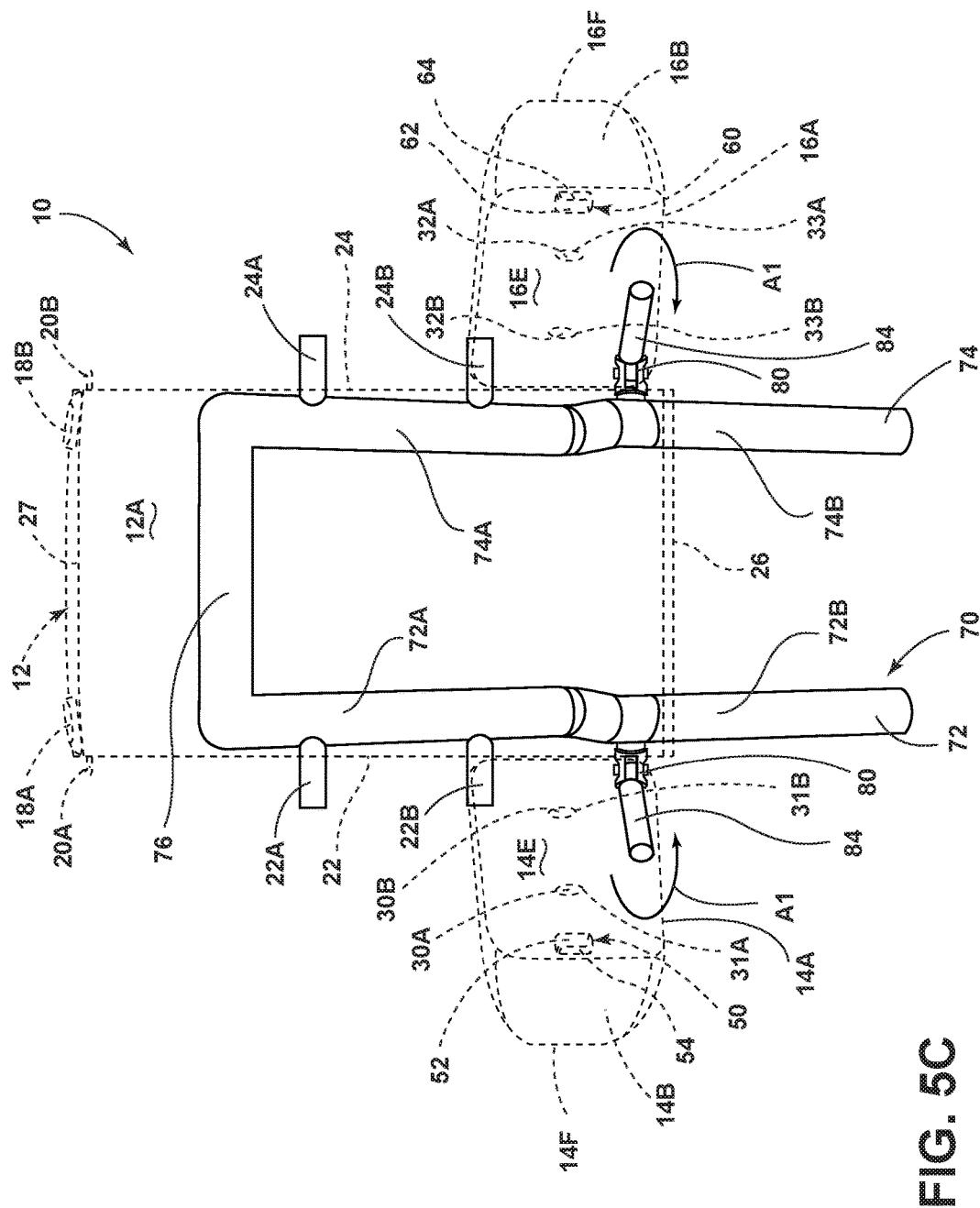
FIG. 5C is a front elevational view of the headrest assembly of FIG. 5B with the side supports in fully deployed positions.

As further shown in FIG. 3A, the locator pins 22A, 22B are contemplated to be comprised of a metal material for coupling to a metal support member 70 (FIG. 5A). As comprised of a metal material, the locator pins 22A, 22B are rigid and will be consistently positioned in such a way that the first side support 14 will properly align with the headrest bun 12 when the locator pins 22A, 22B are received in the receiving wells 30A, 30B. As properly aligned with the locator pins 22A, 22B removeably received in the receiving wells 30A, 30B, the front surfaces 12A, 14A of the headrest bun 12 and the first side support 14 are aligned to provide a unitary support surface for the headrest assembly 10. As metal members, the locator pins 22A, 22B include outer surfaces 23A, 23B, respectively, that may be covered with a coating, such as a flexibly resilient coating comprised of a polymeric material, a cloth material, a foam material, a rubberized material or any other like coating that can reduce sound and vibration between the locator pins 22A, 22B and the receiving wells 30A, 30B. Further, it is contemplated that inner perimeter surfaces 35A, 35B of the receiving wells 30A, 30B may include linings which are configured to absorb sound and vibration at the interaction of the locator pins 22A, 22B with the receiving wells 30A, 30B. Such linings may be comprised of polymeric material, cloth material, rubber material, or any other resilient or sound absorbing material.

As further shown in FIG. 3A, the sides 42, 44 of the occupant's head 40 extend outwardly passed the side portions 22, 24 of the headrest bun 12. Thus, the sides 42, 44 of the occupant's head 40 would be in the way if the first and second side supports 14, 16 simply rotated downward to a deployed position. Instead, the first and second side supports 14, 16 move outward and then rotate downward, thereby providing proper clearance and avoiding any interference with the occupant's head 40.

Figure 3B:
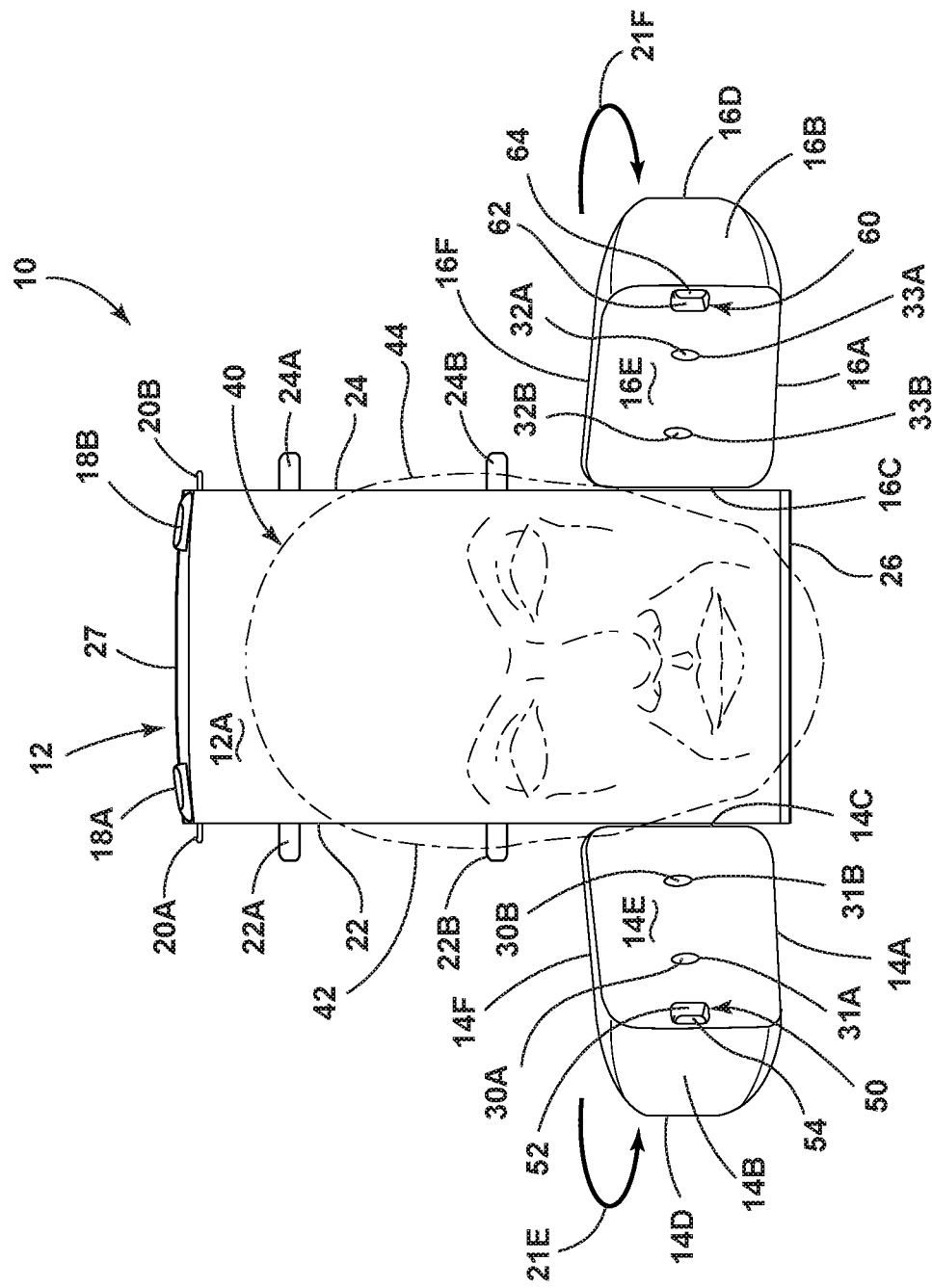
FIG. 3B is a is a front elevational view of the headrest assembly of FIG. 3A, with the side supports illustrated in fully deployed positions around the seat occupant's head.

Referring now to FIG. 3B, the first and second side supports 14, 16 have been inwardly rotated along the deployment paths as indicated by arrows 21E, 21F. The rotation of the first and second side supports 14, 16 along the deployment paths indicated by arrows 21E, 21F is the same pivoting movement of the first and second hinge assemblies 28A, 28B indicated by arrows 21A, 21B shown in FIG. 2.

Movement of the first and second hinge assemblies 28A, 28B is further described below with reference to FIGS. 6A-6D. With the first and second side supports 14, 16 inwardly rotated along the deployment paths as indicated by arrows 21E, 21F, the first and second side supports 14, 16 can cradle the head 40 of the seat occupant near the sides 42, 44 thereof, to provide enhanced neck and head support for the seat occupant. In this cradling position, the inner side surfaces 14E, 16E of the first and second side supports 14, 16, respectively, face inwardly towards the head 40 of the seat occupant. With the first and second side supports 14, 16 positioned in the cradling position shown in FIG. 3B, the head 40 of the seat occupant will be supported in the upright position shown. In the cradling position, the first and second side supports 14, 16 are considered to be fully deployed.

Figure 4B:
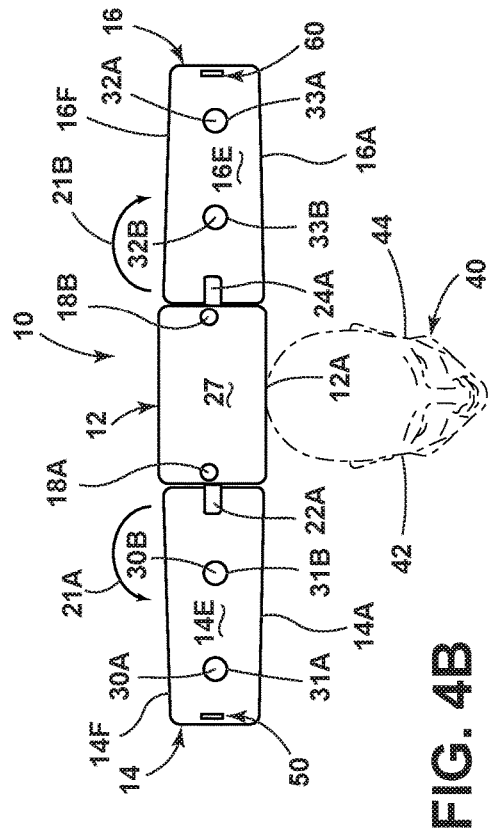
FIG. 4B is a is a top plan view of the headrest assembly and the seat occupant's head of FIG. 3A, with the side supports illustrated in partially deployed positions.
Figure 4C:
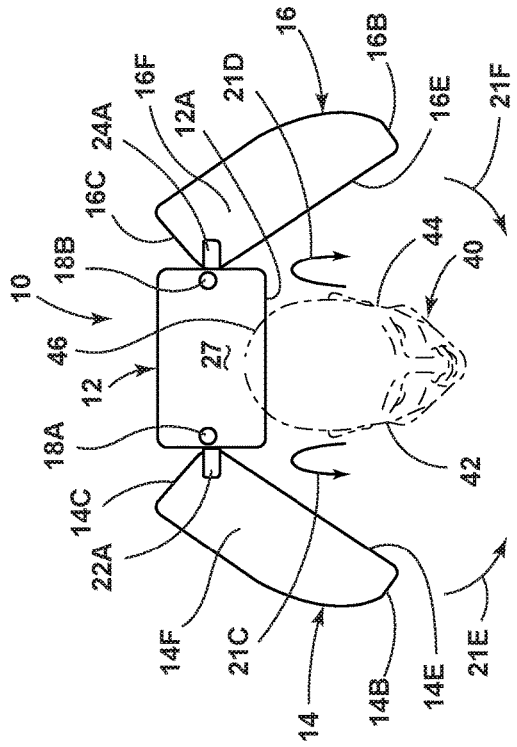
FIG. 4C is a is a top plan view of the headrest assembly and the seat occupant's head of FIG. 3A, with the side supports illustrated in fully deployed positions around the seat occupant's head.
Figure 4A:
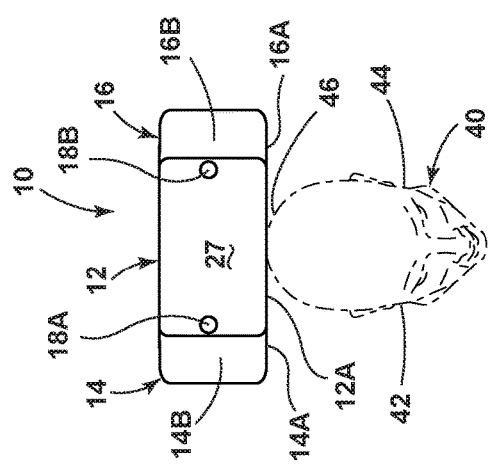
FIG. 4A is a top plan view of the headrest assembly of FIG. 1 showing a seat occupant's head in phantom adjacent thereto.

Referring now to FIG. 4A, the headrest assembly 10 is shown from a top plan view with the head 40 of the seat occupant positioned adjacent thereto. In FIG. 4A, the first and second side supports 14, 16 are shown in the upright retained positions, as further shown in FIG. 1. A rear portion 46 of the occupant's head 40 is shown abutting the front surface 12A of the headrest bun 12. Referring now to FIG. 4B, the headrest assembly 10 is shown from a top plan view with the first and second side supports 14, 16 in partially deployed positions. In the partially deployed positions, the inner side surfaces 14E, 16E of the first and second side supports 14, 16 are upwardly facing. Thus, the configuration of the first and second side support 14, 16 shown in FIG. 4B is akin to the configuration shown in FIG. 2. FIG. 4B differs from FIG. 2 in that the first and second side support 14, 16 have been moved fully downward along the deployment paths as indicated by arrows 21A, 21B along a first pivot axis A1. From FIG. 4B to FIG. 4C, the first and second side support 14, 16 have been rotated along a second axis A2 (along paths 21C, 21D, as described above) to configure the inner side surfaces 14E, 16E to outwardly facing positions, as described above with reference to FIG. 3A. Further, in moving from FIG. 4B to FIG. 4C, the first and second side support 14, 16 have also been rotated again along the first axis A1 (along paths 21E, 21F, as described above) to move the first and second side supports 14, 16 to the cradling position, as described above with reference to FIG. 3B.

Referring now to FIG. 5A, the headrest assembly 10 is shown in phantom, such that a support member 70 is revealed. Support member 70 is configured to couple the headrest assembly 10 to the upper portion 8 of the seat back 6 shown in FIG. 1. The support member 70 is contemplated to be a metal member which includes first and second support posts 72, 74 which are interconnected by an upper cross-member 76 to provide an overall inverted U-shaped configuration to the support member 70. Upper portions 72A, 74A of the support posts 72, 74 are disposed within a body portion 12E of the headrest bun 12. In this way, the support member 70 supports the headrest bun 12 and the first and second side supports 14, 16 as hingedly coupled to the support member 70. Lower portions 72B, 74B of the first and second support posts 72, 74 outwardly extend from the lower portion 26 of the headrest bun 12 for coupling to a frame assembly of the seat assembly 2. In this way, the headrest assembly 10 is rigidly supported on the seat assembly 2 by the support member 70, which is a fixed member. In the embodiment shown in FIG. 5A, the upper and lower locator pins 22A, 22B are shown disposed on the upper portion 72A of the first support post 72. Similarly, the upper and lower locator pins 24A, 24B are shown disposed on the upper portion 74A of the second support post 74. In this way, the locator pins 22A, 22B and 24A, 24B are rigidly supported in their respective outwardly extending positions for locating the first and second side supports 14, 16 thereto, by the locator pins 22A, 22B, and 24A, 24B being received in receiving wells 30A, 30B and 32A, 32B, respectively. The first and second hinge assemblies 28A, 28B are also shown coupled to the first and second support posts 72, 74, respectively. The first and second hinge assemblies 28A, 28B share a number of common features, such that, it is contemplated that the features described for either hinge assembly 28A, 28B are also features incorporated into the other hinge assembly in a mirrored configuration.

As further shown in FIG. 5A, the first hinge assembly 28A includes a central hub 80 which is pivotally coupled to the first support post 72 for rotation along the second pivot axis A2. An attachment flange 84 is pivotally coupled to the hub 80 for rotation relative to the hub 80 along the first pivot axis A1. Thus, movement of the attachment flange 84 along the first pivot axis A1 provides for the deployment movement along the deployment path 21A of the first side support 14 shown in FIG. 2 and FIG. 3A. The twisting or pivoting motion illustrated along the second pivot axis A2 of the hub 80 relative to the support member 70 provides for the inwardly turning deployment path 21C of first side support 14 shown in FIGS. 3A and 4C. Pivoting movement of the attachment flange 84 along the first pivot axis A1 is also used to provide for the movement to the cradling position as indicated by arrow 21E in FIG. 3B once the hub 80 has rotated along the second pivot axis A2, as further described below. The attachment flange 84 is disposed within the body portion 14G of the first side support 14 and is configured to couple to an engagement feature or support member for the first side support 14, which may be a ridged support feature or a foam or cushion material. The attachment flange 84 is configured to be fixedly coupled to the first side support 14 for movement therewith.

Referring now to FIG. 6A, the second hinge assembly 28B is shown, which, as noted above, is an identical representation to the first hinge assembly 28A in a mirrored configuration. The second hinge assembly 28A includes the central hub 80 and the attachment flange 84 which is pivotally coupled to the central hub at first pivot axis A1, as described above. The second hinge assembly 28A further includes an anchor portion 88 that is also pivotally coupled to the central hub 80 along a second pivot axis A2. In assembly, the anchor portion 88 is fixedly coupled to the support member 70 at the second support post 74. The anchor portion 88 may include engagement features 90 to provide structural features to fixedly engage the support member 70. The central hub 80 can rotate relative to the fixedly coupled anchor portion along the second pivot axis A2 from the position shown in FIG. 6A to the position shown in FIG. 6C. As explained above, the attachment flange 84 is fixedly coupled to the second side support 16. The attachment flange 84 may include engagement features 90 to provide structural features to fixedly engage the second side support 16. As further noted above, the attachment flange 84 is pivotally coupled to the central hub 80 for movement along the first axis A2. Thus, the second hinge assembly 28A is a dual hinge assembly having pivot points P1 and P2 for rotational movement along the first and second pivot axes A1, A2. Movement of the attachment flange 84 along the first pivot axis A1 occurs when the second side support 16 is moved from the upright retained position to the partially deployed positions shown in FIGS. 2 and 3A along deployment path 21B. This movement of the attachment flange 84 along the first axis A1 is illustrated in FIG. 6A by arrow 86. Movement of the central hub 80 along the second pivot axis A2 occurs when a user rotates the second side support 16 from the partially deployed position (FIGS. 2 and 4B) to the twisting position (FIGS. 3A and 4C) which orientates the inner side surface 16E of the second side support 16 to the forward facing position shown in FIG. 3A. This movement of the central hub 80 along the second axis A2 is illustrated in FIG. 6C by arrow 82. Once the second side support 16 is downwardly deployed along the first axis A1 and rotated along the second axis A2, the second hinge assembly 28B will be in the position shown in FIG. 6C. To move the second side support 16 to the cradling position shown in FIGS. 3B and 4C, the attachment flange 84 will again pivot along the first axis A1 as indicted by arrow 86 in FIG. 6D. It is contemplated that the engagements between the central hub 80 and the attachment flange 84 and anchor portion 88 are constant torque engagements, such that the hinge assembly 28B is dual hinge assembly with two constant torque pivoting axes A1, A2.

According to one aspect of the present invention, a headrest assembly includes a headrest bun and first and second side supports respectively coupled to first and second side portions of the headrest bun by first and second hinge assemblies. The first and second side supports include respective first and second receiving wells. The first and second side supports are operably between retracted and deployed positions relative to the headrest bun. A support member is partially received within the headrest bun and includes a first locator pin extending outwardly from the first side portion of the headrest bun. A second locator pin extends outwardly from the second side portion of the headrest bun. The first and second locator pins are respectively received in the first and second receiving wells of the first and second side supports when the first and second side supports are in the retracted position.

Embodiments of the first aspect of the invention can include any one or a combination of the following features:
  wherein the first and second receiving wells are disposed on inner side surfaces of the first and second side supports, and further wherein the first and second receiving wells inwardly extend into body portions of the first and second side supports from outer openings of the first and second receiving wells;
  a first release button operably coupled to a first engagement feature, wherein the first engagement feature outwardly extends from the first side portion of the headrest bun;
  a second release button operably coupled to a second engagement feature, wherein the second engagement feature outwardly extends from the second side portion of the headrest bun;
  a first retention feature positioned the inner side surface of the first side support, the first retention feature including a first engagement member, wherein the first engagement member of the first side support engages the first engagement feature of the headrest bun when the first side support is in the retracted position;
  a second retention feature positioned the inner side surface of the second side support, the second retention feature including a second engagement member, wherein the second engagement member of the second side support engages the second engagement feature of the headrest bun when the second side support is in the retracted position;
  a coating on the locator pins;
  a lining in the receiving wells; and/or
  wherein the hinge assembly includes a first pivot axis and a second pivot axis that is different than the first pivot axis, and further wherein the side support is rotatable along both the first and second pivot axes when the at least one locator pin is removed from the at least one receiving well.

According to another aspect of the present invention, a headrest assembly includes a headrest bun and a side support having at least one receiving well. The side support is operably coupled to the headrest bun between retracted and deployed positions by a hinge assembly. At least one locator pin extends outwardly from the headrest bun and is received in the at least one receiving well of the side support when the side support is in the retracted position.

Embodiments of the second aspect of the invention can include any one or a combination of the following features:
- wherein the at least one locator pin includes first and second locator pins;
- wherein the at least one receiving well includes first and second receiving wells;
- wherein the first locator pin is removeably received in the first receiving well when the side support is in the retracted position, and further wherein the second locator pin is removeably received in the second receiving well when the side support is in the retracted position;
- wherein the first and second locator pins extend outwardly from a side portion of the headrest bun, and further wherein the first locator pin is positioned above the second locator pin;
- wherein the hinge assembly includes a first pivot axis and a second pivot axis that is different than the first pivot axis, and further wherein the side support is rotatable along both the first and second pivot axes when the at least one locator pin is removed from the at least one receiving well; and/or
- wherein the side support and the headrest bun include front surfaces, and further wherein the front surface of the headrest bun is aligned with the front surface of the side support when the at least one locator pin is received in the at least one receiving well of the side support.

According to another aspect of the present invention, a headrest assembly includes a headrest bun and a side support pivotally coupled to the headrest bun by a hinge assembly. The hinge assembly includes an anchor portion pivotally coupled to a central hub for rotation along a first axis, and an attachment flange pivotally coupled to the central hub for rotation along a second axis. The side support is rotatable along both the first and second axes relative to the headrest bun.

Embodiments of the third aspect of the invention can include any one or a combination of the following features:
- at least one receiving well inwardly extending into a body portion of the side support from an inner side surface of the side support;
- at least one locator pin outwardly extending from a side portion of the headrest bun, wherein the at least one locator pin is received in the at least one receiving well of the side support when the side support is in an upright retained position relative to the headrest bun;
- a support member partially received within the headrest bun, wherein the at least one locator pin is coupled to and outwardly extends from the support member; and/or
- wherein the hinge assembly includes constant torque engagements between the central hub and the anchor portion and the attachment flange at the first and second pivot axes.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A headrest assembly, comprising:
   a headrest bun;
   first and second side supports respectively coupled to first and second side portions of the headrest bun by respective first and second hinge assemblies, wherein the first and second side supports include respective first and second receiving wells, and further wherein the first and second side supports are operable between retracted and deployed positions relative to the headrest bun; and
   a support member formed as a single rigid frame comprising a generally U-shaped element partially received within the headrest bun and having a first locator pin extending outwardly from the first side portion of the headrest bun, and a second locator pin extending outwardly from the second side portion of the headrest bun, wherein the first and second locator pins are respectively received in the first and second receiving wells of the first and second side supports when the first and second side supports are in the retracted position.

2. The headrest assembly of claim 1, wherein the first and second receiving wells are disposed on inner side surfaces of the first and second side supports, and further wherein the first and second receiving wells inwardly extend into body portions of the first and second side supports from outer openings of the first and second receiving wells.

3. The headrest assembly of claim 2, including:
   a first release button operably coupled to a first engagement feature, wherein the first engagement feature outwardly extends from the first side portion of the headrest bun; and
   a second release button operably coupled to a second engagement feature, wherein the second engagement feature outwardly extends from the second side portion of the headrest bun.

4. The headrest assembly of claim 3, including:
   a first retention feature positioned on the inner side surface of the first side support, the first retention feature including a first engagement member, wherein the first engagement member of the first side support engages the first engagement feature of the headrest bun when the first side support is in the retracted position; and
   a second retention feature positioned the inner side surface of the second side support, the second retention feature including a second engagement member, wherein the second engagement member of the second side support engages the second engagement feature of the headrest bun when the second side support is in the retracted position.

5. The headrest assembly of claim 1, wherein the support member and the first and second locator pins are comprised of a metal material, and further wherein the first and second locator pins include outer surfaces having a coating disposed thereon.

6. The headrest assembly of claim 5, wherein the coating is flexibly resilient.

7. The headrest assembly of claim 6, wherein the coating is comprised of one of a polymeric material, a foam material, a cloth material and a flock material.

8. The headrest assembly of claim 1, wherein the support member and the first and second locator pins are comprised of a metal material, and further wherein the first and second receiving wells include linings disposed on inner perimeter surfaces thereof.

9. A headrest assembly, comprising:
a headrest bun having a laterally outwardly facing side surface;
a side support having at least one receiving well, the side support pivotally coupled about a plurality of axes to the headrest bun between retracted and deployed positions by a hinge assembly; and
at least one locator pin extending outwardly from the laterally outwardly facing side surface of the headrest bun at a location spaced from the hinge assembly, wherein the at least one locator pin is received in the at least one receiving well of the side support when the side support is in the retracted position.

10. The headrest assembly of claim 9, wherein the at least one locator pin includes first and second locator pins.

11. The headrest assembly of claim 10, wherein the at least one receiving well includes first and second receiving wells.

12. The headrest assembly of claim 11, wherein the first locator pin is removeably received in the first receiving well when the side support is in the retracted position, and further wherein the second locator pin is removeably received in the second receiving well when the side support is in the retracted position.

13. The headrest assembly of claim 12, wherein the first and second locator pins extend outwardly from a side portion of the headrest bun, and further wherein the first locator pin is positioned above the second locator pin.

14. The headrest assembly of claim 9, wherein the hinge assembly includes a first pivot axis and a second pivot axis that is different than the first pivot axis, wherein the plurality of axes comprise the first and second pivot axes, and further wherein the side support is rotatable along both the first and second pivot axes when the at least one locator pin is removed from the at least one receiving well.

15. The headrest assembly of claim 9, wherein the side support and the headrest bun include front surfaces, and further wherein the front surface of the headrest bun is aligned with the front surface of the side support when the at least one locator pin is received in the at least one receiving well of the side support.

* * * * *